United States Patent [19]

Miyasaka et al.

[11] Patent Number: 4,582,420
[45] Date of Patent: Apr. 15, 1986

[54] REPRODUCTION CAMERA

[75] Inventors: Eiji Miyasaka; Kojirō Henmi; Iwao Hirose; Hiroyuki Yonehara, all of Hikone, Japan

[73] Assignee: Dainippon Screen Mfg. Co., Ltd., Kyoto, Japan

[21] Appl. No.: 539,185

[22] Filed: Oct. 5, 1983

[30] Foreign Application Priority Data

Oct. 26, 1982 [JP] Japan .............................. 57-188479

[51] Int. Cl.$^4$ ....................... G03B 27/52; G03B 27/72
[52] U.S. Cl. ........................................ 355/55; 355/68; 355/69; 355/71
[58] Field of Search ....................... 355/67, 68, 71, 69, 355/55; 354/459, 476–479

[56] References Cited

U.S. PATENT DOCUMENTS

| | | | |
|---|---|---|---|
| 3,086,434 | 4/1963 | Edelstein | 354/476 |
| 3,386,358 | 6/1968 | Kropp | 355/68 |
| 3,872,484 | 3/1975 | Hashimoto et al. | 354/478 |
| 4,113,378 | 9/1978 | Wirtz | 355/55 |
| 4,171,904 | 10/1979 | Tani | 355/55 |
| 4,264,195 | 4/1981 | Tokuda et al. | 355/68 X |
| 4,390,270 | 6/1983 | Biederman et al. | 355/68 X |

FOREIGN PATENT DOCUMENTS

| | | |
|---|---|---|
| 0021363 | 6/1980 | European Pat. Off. |
| 1952553 | 4/1971 | Fed. Rep. of Germany . |
| 2226904 | 12/1973 | Fed. Rep. of Germany ...... 354/479 |
| 2314028 | 10/1974 | Fed. Rep. of Germany . |
| 2364914 | 7/1975 | Fed. Rep. of Germany . |
| 1354478 | of 1964 | France ............................. 354/479 |
| 4966331 | 10/1972 | Japan . |
| 58-40745 | 3/1983 | Japan . |
| 402592 | 11/1965 | Switzerland . |
| 1135536 | 4/1967 | United Kingdom . |
| 1217024 | 8/1968 | United Kingdom . |
| 1233928 | 10/1968 | United Kingdom . |
| 1472788 | 9/1974 | United Kingdom . |
| 1560580 | 8/1976 | United Kingdom . |
| 2049208 | 4/1980 | United Kingdom . |

Primary Examiner—Russell E. Adams
Assistant Examiner—Della Rutledge
Attorney, Agent, or Firm—Brumbaugh, Graves, Donohue & Raymond

[57] ABSTRACT

There is provided a reproduction camera comprising an optical sensor provided at a location to which light from a light source on the image side can be reached and which is substantially outside the image focal plane and not near by the same, a correcting device by which a quantity of light received by the optical sensor has a relation with a quantity of light received on the image focal plane, and a control system for controlling exposure according to a signal corrected by the correcting device.

10 Claims, 4 Drawing Figures

REPRODUCTION CAMERA

BACKGROUND AND SUMMARY OF THE INVENTION

The present invention relates to a reproduction camera, in which a photometry of original picture is carried out by using an optical sensor, and in which the exposure control is made in accordance with a signal therefrom.

Generally in the conventional reproduction camera, the density of the original picture is detected by a certain optical sensor, and a quantity of exposure to a sensitive material (hereinafter called the "photographic film") is controlled in accordance with a value detected thereby. When such a conventional reproduction camera is used, it is often the case that not only the density must be changed according to the original picture, but the photographing magnification and the diaphragm value of lens must be changed. Thus it is an important problem to given an appropriate exposure to the photographic film exactly according to said change or changes. In order to solve the problem, it will be an ideal method to provide an optical sensor on the image focal plane or substantially near by the same. In this respect, several attempts have been made as disclosed in Japan Patent Publication No. 49-66331 and others.

It is, therefore, an object of the present invention to solve the above-discussed problem, and more particularly to provide a reproduction camera available not only for the specified or fixed magnification but for any other optional magnification.

Thus, in accordance with the present invention, there is provided a reproduction camera comprising:

(1) an optical sensor provided at a location to which light from a light source on the image side of lens can be reached, and in which the sensor is substantially displaced from the image focal plane and not near the same, (2) a correcting device by which a quantity of light received by the sensor has a relation with a quantity of light received on the image focal plane, and (3) a control system for controlling exposure according to a signal corrected by said correcting device.

Other objects, features and advantages of the present invention will become apparent in the course of the following description with the accompanying drawings.

BRIEF DESCRIPTION OF THE DRAWINGS

In the accompanying drawings, forming a part of the present application, and in which like parts are designated by the reference numerals and characters throughout the same.

DESCRIPTION OF THE PREFERRED EMBODIMENTS

Figure 1:
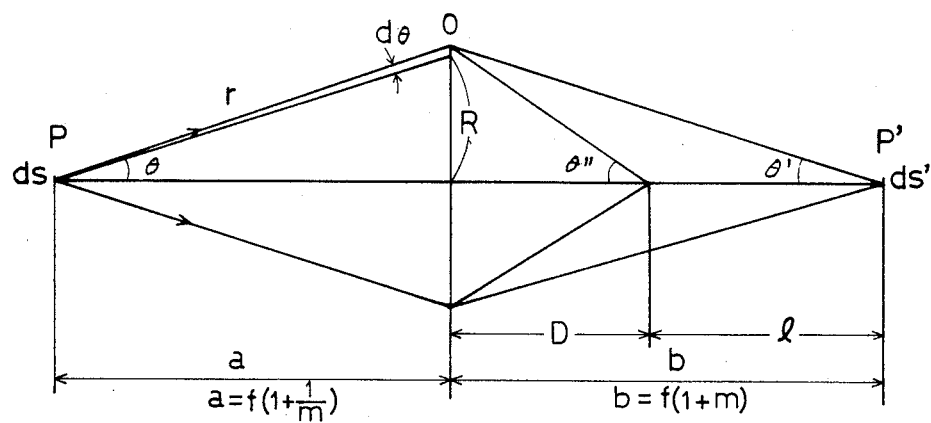
FIG. 1 shows a principle on which the present invention is based.

Referring first to FIG. 1, there is shown a principle on which the quantity of light received by the optical sensor has a relation with a quantity of light received by the image focal plane. In FIG. 1, supposing that an effective diaphragm of a lens system is in the shape of a circle having a radius R thereof, every flux incident from an object point P to the lense system so as to form an image is included in a cone whose top is said object point P and whose bottom is an entrance pupil (diaphragm). In the same manner, the flux convergent on the image point P' is included in a cone whose top is the point P' and whose bottom is an entrance pupil. Thus the object point P and the image point P' are conjugated with each other, the former being the image point of the latter and vice versa.

The flux F entering the foregoing entrance pupil can be found as follows.

Supposing that a minute area dS which is located on the optical axis of lens (O) and is vertical to said optical axis is a light source of perfect diffusion having a luminance $L(cd/m^2)$, the luminous intensity in the direction of $\theta$ becomes $L \times dS \times \cos\theta$, and the solid angle $d\omega$ is equated as follows;

$$d\omega = \frac{(2\pi R) \times (r \times d\theta)}{r^2} = \frac{(2\pi \times r\sin\theta) \times (r \times d\theta)}{r^2}$$
$$= 2\pi\sin\theta \times d\theta$$

Accordingly the flux dF included in said $d\omega$ is equated as follows;

$$dF = (L \times dS \cos\theta) \times (2\pi\sin\theta \times d\theta)$$
$$= 2\pi L \times \sin\theta \times \cos\theta \times d\theta$$

Thus the flux is total can be calculated as follows;

$$F = 2\pi L \times dS \int_0^\theta \sin\theta \times \cos\theta \times d\theta \qquad (1)$$
$$= \pi L \times dS \int_0^\theta \sin 2\theta \times d\theta = \pi L \times dS[-\tfrac{1}{2} \times \cos 2\theta]_0^\theta$$
$$= \pi L \times dS\{\tfrac{1}{2}(1 - \cos 2\theta)\} = \pi L \times \sin^2\theta \times dS$$

The above-mentioned flux, after passing through the lens system, is converged to dS' which is an image of dS. Now, writing k for the transmission factor of the lens system, the illuminance E of the image is expressed as follows;

$$E = k\pi L \sin^2\theta \frac{dS}{dS'} \qquad (2)$$

In this connection, as the refractive index of the space on the side of light source is equivalent to that on the side of image, the sine condition is datisfied to be $$\frac{\sin^2\theta'}{\sin^2\theta} = \frac{dS}{dS'},$$

accordingly the foregoing equation (2) can be rewritten as follows;

$$E = k\pi L \sin^2\theta' \qquad (3)$$

In this manner, in the ideal lens system, the illuminance of the image of the light source with perfect diffusion depends upon the angle $\theta'$ defined by the exit pupil to the image point, and is equivalent to the illuminance produced when a disc light source with perfect diffusion of the same size having the luminance kL is placed on the location of the exit pupil. In effect, the present invention makes the use of the above-described principle, and more particularly, is based on the relation between the flux received by the area S on the optical axis and which is located on the side of the image surface and is distant from the image formation surface and the flux received by the area S on the optical axis which is located on the image focal plane.

Thus, the flux $F_o$ received by the area S on the image focal plane is expressed according to the foregoing equation (3) as follows;

$$F_o = k\pi L \sin^2 \theta' \times S \qquad (4)$$

In the same manner, the flux F received by the area S which is distant by l from the image focal plane, as shown in FIG. 1, is expressed as follows;

$$F = k\pi L \sin^2 \theta'' \times S \qquad (5)$$

The relation $F(\theta)$ between the foregoing two equations can be expressed, on the basis of the flux of the optical sensor, as follows;

$$F(\theta) = \frac{\sin^2\theta'}{\sin^2\theta''} \qquad (6)$$

Then considering that $$\sin^2\theta' = \frac{R^2}{R^2 + b^2}$$

and that $$\sin^2\theta'' = \frac{R^2}{R^2 + D^2},$$

the foregoing equation (6) can be rewritten as follows;

$$F(\theta) = \frac{R^2 + D^2}{R^2 + b^2} \qquad (7)$$

where, involving the focal length f, the magnification m, the radius R of the diaphragm aperture and the diaphragm value $F_{no}$, equations $D = b-1$, $b = f(1+m)$, and $R = f/(2F_{no})$ can be obtained. Thus, on the optical axis, in accordance with the relation expressed by the equation (7), the quantity of light received by the optical sensor which is substantially not located on the image focal plane, can be transformed into the quantity of light received on the image focal plane, thereby the exposure being controlled.

Further, when $D \geq 3R$, or when the optical sensor is kept away from the principal point of the lens by more than three times the radius R of the diaphragm aperture, even if the foregoing equation (7) is rewritten as follows, there remains an error of no more than 1%;

$$F(\theta) \approx D^2/b^2 \qquad (8)$$

And even when the optical sensor is arranged on a location other than the optical axis, the relation with the flux given to the corresponding location on the image focal plane can be expressed by the foregoing equation (7) or (8). Namely, involving quantity $\beta$ of light received by the optical sensor not located on the image focal plane, quantity $\alpha$ of light on the image focal plane is expressed as follows;

$$\alpha = F(\theta) \times \beta \qquad (9)$$

In this connection, when $D < 3R$, the equation (7) is to be applied, while in case $D \geq 3R$, the equation (8) is to be applied.

Now, in accordance with the present invention, there is provided an embodiment having a correcting device making use of the above-described relation so that the control of exposure may be carried out according to the signal corrected thereby.

Figure 2:
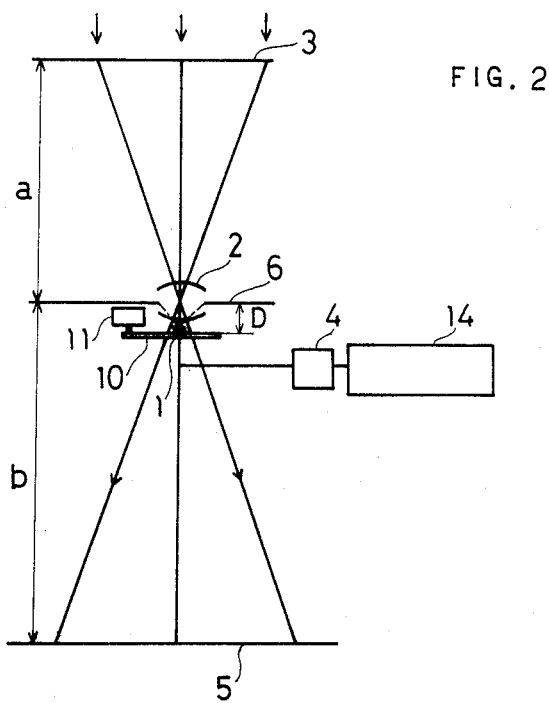
FIG. 2 and FIGS. 3(A), (B) are typical illustrations of embodiments according to the present invention.

FIG. 2 is a typical illustration showing an embodiment in which the present invention is associated with that of Japan Utility Model Application No. 56-135418 filed by the same applicant. In FIG. 2, a shutter blade 10 is provided immediately behind a lens (2) at the predetermined spacing D from the principal point of the lens (in FIG. 2, the location of the principal point of the lens is simply shown at the same location as the diaphragm 6 of the lens). Said shutter blade 10 is fixed to the rotatable shaft of a rotary solenoid 11 secured to a lens holder, and the releasing actuation is made in a moment. An optical sensor 1 is fixed to the light receiving surface of the shutter blade 10 so that the signal detected by the sensor may be input to the exposure control system (14) through a correcting device 4. The measurement of the density of an original picture 3 is made by illuminating an appropriate illuminance of light from back or front of the original picture 3 and by detecting the transmitted light or the reflected light therefrom (in FIG. 2 the former is illustrated) by the sensor 1. Under above-described formation, an appropriate quantity of exposure can be determined before photographing, i.e. when the shutter is still closed.

In the foregoing embodiment shown in FIG. 2, as the distance D between the principal point of the lens and the light receiving surface of the sensor 1 is relatively short, it is preferred to take the equation (7) for the correction factor $F(\theta)$ in said correcting device 4.

Figure 4:
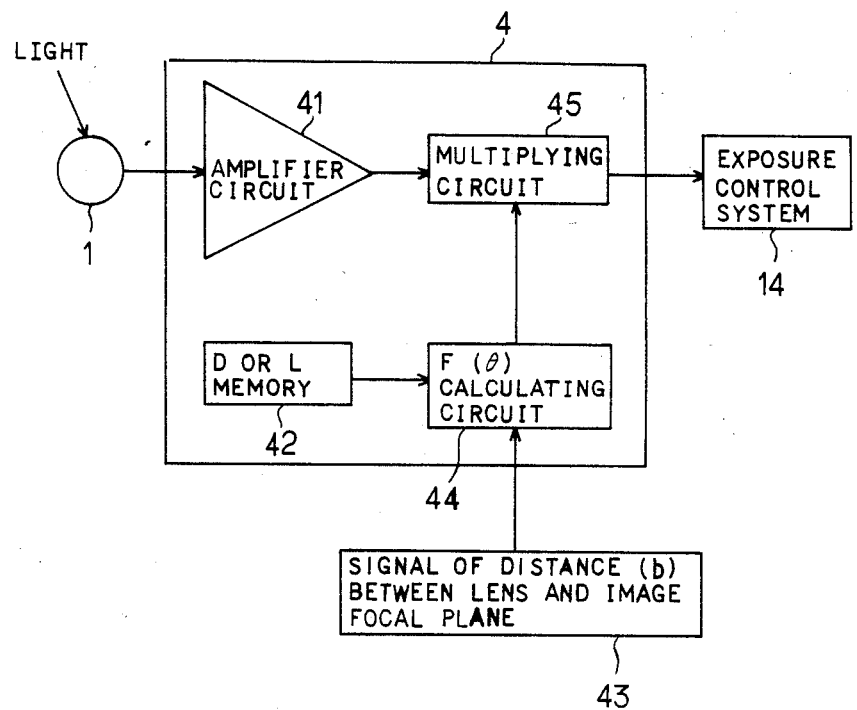
FIG. 4 is a block diagram showing the substantial part of the exposure control system including a correcting device according to the present invention.

FIG. 4 is a block diagram of a substantial part of the exposure control system including said correcting device 4. A photoelectric element for receiving light, such as a photodiode or phototransistor, is employed to be the sensor 1. The correcting device 4 comprises an amplifier circuit 41 for amplifying the electrical signal photoelectrically transferred, a memory 42 for storing a distance constant (D) between the principal point of the lens and the optical sensor 1 or a constant (l) for calculating said distance D, a calculating circuit 44 for calculating the correction factor $F(\theta)$ expressed by the equation (7) or (8) based on said constant (D) or (l), the diaphragm value $F_{no}$ (or R) of the lens and the signal of the distance (b) between the lens and the image focal plane, and a multiplying circuit 45 for calculating the quantity of light corresponding to the image focal plane by multiplying the signal of said correction factor $F(\theta)$ by the amplification signal output by the amplifier circuit 41.

The output signal of the above-described correcting device 4 is input to the exposure control system 14 by which the exposure of reproduction camera can be appropriately controlled.

Figure 3:
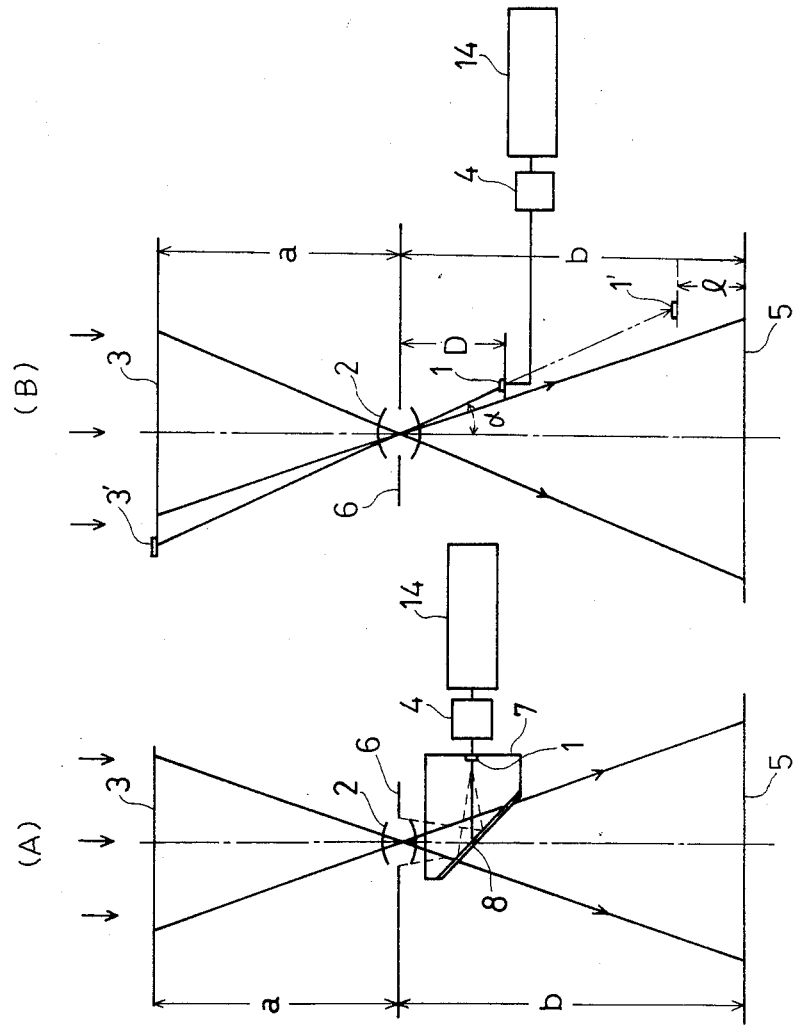

FIGS. 3(A) and (B) show another two embodiments, respectively. FIG. 3(A) shows an embodiment in which the optical sensor 1 is located inside a half mirror device 7 fixed to a lens holder (not illustrated) so that the reflected light from a half mirror 8 may be detected by the sensor 1. In this case, the optical path between the principal point of the lens and the optical sensor 1 is a distance D to which the equation (7) or (8) is applied. This embodiment can be satisfactory for an exposure control device in which the exposure is terminated at the moment when the quantity of the light integrated during the exposure has amounted to an appropriate exposure (hereinafter called an "integrating exposure system"). The necessary correction must be made on the difference between the reflection factor and the transmission factor of the half mirror.

In this connection, a further embodiment can be conceived, wherein under a generally similar arrangement a total reflection mirror is used in place of the half mirror, and wherein said total reflection mirror is turned by 90° so that the changeover between the photometry and the exposure may be made.

FIG. 3(B) shows an embodiment in which the optical sensor 1 is located outside the effective photographing area. An original picture 3' of a reference density is located corresponding to the optical sensor 1 and which is outside the effective picture area, and the exposure is corrected on the basis of the quantity of light from said original picture 3' so that the appropriate exposure may be obtained. Further, by arranging said optical sensor 1 at the predetermined angle $\alpha$ in the location outside the effective picture area, the distance D between the principal point of the lens and the optical sensor 1' can be a fixed value. In the same manner, as shown by a broken line, the distance l between the image focal plane and the optical sensor 1 can be a fixed value (in this case the value is b−l according to the variation of the distance between the lens and the image focal plane. D is a variable).

Yet another embodiment is conceived, making said D or l variable in relation to the distance (b) for the image focusing, although the construction in this case may be complicated. To this case equation (8) is applied. Also the embodiment of FIG. 3(B) can be satisfactorily applied for said integrating exposure system.

It will be evident to those skilled in the art that the present invention is not limited to the details of the foregoing illustrative embodiments, and that the present invention may be embodied in other specific forms without departing from the essential attributes thereof, and it is therefore desired that the foregoing embodiments be considered in all respects as illustrative and not restrictive, reference being made to the appended claims rather than the foregoing description, and all changes which come with the meaning and the range of equivalency of the claims are therefore intended to be embraced therein.

What is claimed is:

1. A reproduction camera having a lens with a diaphragm aperture comprising an optical sensor displaced behind the diaphragm on the image side of the lens and displaced a substantial distance from the image focal plane of the lens, whereby the sensor receives the light to be measured through the lens, correcting means for receiving an input from the optical sensor related to the quantity of light measured by the optical sensor through the lens and generating an output signal that corrects for the quantity of light received on the image focal plane and exposure control means for controlling the duration of exposure according to the optical signal from said correcting means.

2. A reproduction camera as set forth in claim 1, including a shutter behind the diaphragm on the image side of the lens and wherein the optical sensor is on the light receiving surface of the shutter.

3. A reproduction camera as set forth in claim 1, including a half-mirror displaced behind the diaphragm on the image side of the lens and wherein the optical sensor receives light reflected from the half mirror.

4. A reproduction camera as set forth in claim 1, including a total reflection mirror displaced behind the diaphragm on the image side of the lens and wherein the optical sensor is on the total reflection mirror.

5. A reproduction camera as set forth in claim 1, in which the correcting means includes means for correcting the quantity of light measured by the optical sensor by means which adjusts for the distance between the lens and the optical sensor and the distance between the lens and the image focal plane.

6. A reproduction camera as set forth in claim 1, wherein the optical sensor is provided outside the effective image area so that the sensor can measure the light during exposure and the exposure can be terminated by light integrated during exposure without impeding the light directed toward the image focal plane.

7. A reproduction camera as set forth in any of claims 1 through 6, in which the correction factor of the correcting means is $(R^2+D^2)/(R^2+b^2)$ to have a relation with a quantity of light received by the image focal plane, where R is a radius of the diaphragm aperture of the lens, D is a distance between the lens and the light receiving surface of the optical sensor, and b is a distance between the lens and the image focal plane.

8. A reproduction camera as set forth in any of claims 1 through 6, in which the correction factor of the correcting means is $D^2/b^2$ to have a relation with the quantity of light received by the image focal plane.

9. A reproduction camera as set forth in claim 1, in which the correction is by a factor that takes into account the position of the optical sensor relative to the lens and the focal plane of the lens.

10. A reproduction camera as set forth in claim 1, including means deflecting the light to the optical sensor during exposure and means for terminating the exposure when the quantity of light integrated during the exposure is sufficient for proper exposure.

* * * * *